United States Patent [19]

Balsimo et al.

[11] Patent Number: 5,366,632
[45] Date of Patent: Nov. 22, 1994

[54] GLASS MICROBEAD FILTER AND METHOD OF FILTERING

[75] Inventors: William V. Balsimo, Afton; Steven J. St. Mary, Roseville, both of Minn.

[73] Assignee: Minnesota Mining and Manufacturing Company, St. Paul, Minn.

[21] Appl. No.: 25,932

[22] Filed: Mar. 3, 1993

[51] Int. Cl.$^5$ ............................................. B01D 39/06
[52] U.S. Cl. ....................................... 210/777; 210/193
[58] Field of Search ..................... 210/433.1, 773, 770, 210/510.1, 777, 767, 193, 268

[56] References Cited

U.S. PATENT DOCUMENTS

| | | |
|---|---|---|
| 4,153,661 | 5/1979 | Ree et al. . |
| 4,313,832 | 2/1982 | Shimizu et al. ........................ 210/777 |
| 4,713,338 | 12/1987 | Gonzalez-Oliver . |
| 4,810,381 | 3/1989 | Hagen et al. . |
| 4,887,363 | 12/1989 | Burke .................................... 34/10 |
| 4,906,378 | 3/1990 | Hagen et al. . |
| 4,906,381 | 3/1990 | Barbaro ............................. 210/433.1 |
| 4,971,736 | 11/1990 | Hagen et al. . |
| 5,004,531 | 4/1991 | Tiernan ................................ 210/243 |
| 5,013,459 | 5/1991 | Gettings et al. .................. 210/510.1 |
| 5,128,291 | 7/1992 | Wax et al. . |
| 5,190,102 | 3/1993 | Arterbury et al. ................ 210/510.1 |

FOREIGN PATENT DOCUMENTS 52-32728  9/1976  Japan .
59-40767 10/1984  Japan .

OTHER PUBLICATIONS

Chemical Engineers Handbook, 5th Ed., McGraw-Hill, 1973, pp. 19–63.
Filtration & Separation, Jan. Feb. 1991, pp. 33–36.
Journal of Physics D: Applied Physics, 24 (1991) pp. 2111–2114.

Primary Examiner—Robert A. Dawson
Assistant Examiner—W. L. Walker
Attorney, Agent, or Firm—Gary L. Griswold; Walter N. Kirn; Lorraine R. Sherman

[57] ABSTRACT

A layered filter composite comprises a filter medium, and on the upstream surface thereof a homogeneous or graded layer of nonporous spherical glass microbeads as a filter aid. A method for filtering or prefiltering a liquid mixture is disclosed wherein a layer of glass microbeads is used as a filter or filter aid. The layered filter composite is useful in analytical applications as well as in large scale industrial and remedial (clean-up) applications.

23 Claims, No Drawings

GLASS MICROBEAD FILTER AND METHOD OF FILTERING

FIELD OF THE INVENTION

This invention relates to a layered filtering composite comprising glass microbeads as a filter aid. In another aspect, a method of removing suspended solids from liquids using glass microbeads as a filter or prefilter is disclosed.

BACKGROUND OF THE INVENTION

Methods for filtering suspended solids from liquids through filter media frequently rely on filter aids to prefilter the liquid-based mixture and extend the life of the filter media. A filter aid is typically added to a liquid to be filtered prior to processing through a filter medium, or added to the top of a filter medium through which a liquid will be processed. A filter aid inhibits the formation of a densely packed film or cake of solid material that forms on the surface of a filter medium during the process of filtration.

Suspended solids can generally be divided into two groups, deformable and nondeformable. Deformable solids are particularly problematic because they can be compressed readily into densely packed beds, often called flocs or slime. They are primarily biological in origin, and tend to fall into a very specific size range between just under 1 to several dozens of micrometers. Deformable solids are present in higher concentrations in setting water systems (lakes and ponds).

In contrast, moving water systems (rivers, streams, etc.) are likely to have larger concentrations of non-deformable particles. Nondeformable solids are typically inorganic in nature and can vary in dimension from submicrometer to millimeters.

Filter aids function with non-deformable solids by increasing the overall porosity and, therefore, loading capacity of the filtration system. Additionally, filter aids slow the progress of non-deformable solids to the surface of filter media where they can readily penetrate into the pore structure and completely block the flow of liquid. Further, filter aids interrupt the formation of the packed solid film or cake. Filter aids are less efficient in removing non-deformable suspended particles compared to deformable suspended particles.

The Chemical Engineers Handbook (5th Edition, McGraw Hill Book Co., New York (1973) p 19-63) teaches that preferred filter aids are porous and have low bulk density to minimize settling. Conventional filter aids, which are naturally occurring materials, conform to these characteristics. Typical filter aids are diatomaceous earth, sand, cellulose fibers (paper pulp), perlite, fuller's earth, asbestos, sawdust, magnesia, salt, gypsum, and carbon. The most commonly used filter aid is diatomaceous earth.

Additionally, the shape of a material bears on its ability to function as a filter aid. Irregular materials are more susceptible to the formation of very densely packed beds which have correspondingly smaller sized pores which leads to high pressure drop and premature plugging. Another phenomenon associated with the irregular shape is that the surface of these particles can consist of jagged edges which mechanically interlock adjacent particles together and can interfere with bed formation if these locking forces are not overcome. This leads to the formation of "super pores" or channels which negate the intended effect of the filter aid by allowing the suspended solids to pass straight through to the filter medium. The traditional technique to minimize these packing phenomena is to use a low density material that will not rapidly settle out of the liquid and, therefore, will not form a densely packed bed and/or one that has innate porosity which serves to minimize the impact of dense packing.

The use of spherical materials as a filter aid has been broadly described in the prior art. Japanese patent document No. JP59-40767 describes a method for making amorphous non-fused titania particles in the size range of 0.05 to 0.1 micrometer and is broadly disclosed as a filtering agent. U.S. Pat. No. 4,713,338 describes metal oxide based porous spherical beads having a size 5 to 500 micrometers and surface area of 100 to 600 $m^2/g$ which are stated to be useful for filtration applications, with all utility examples directed to gel permeation chromatography.

U.S. Pat. No. 5,128,291 describes a similar procedure for producing porous titania or zirconia spheres with chromatographic properties and also references the utility of such materials as catalyst supports.

Another standard technique in the filtration industry is to utilize graded beds to maximize particulate removal efficiency. This practice involves forming a series of discrete layers of filter media with the smallest average particle size medium at the bottom of the bed and with succeeding layers having larger particle size than the previous layer. Typical practice utilizes at least two bed layers including anthracite, basalt, tuff, sand, and granular activated carbon with the liquid phase entering from the top of the bed. See for example, A. Adin et al., Filtration & Separation, January/February 1991, pp 33-36.

U.S. Pat. No. 4,153,661 relates to a composite article that can comprise a fibrillated polytetrafluoroethylene (PTFE) matrix with glass beads distributed therein. The article is said to be useful as a semipermeable membrane. U.S. Pat. Nos. 4,810,381, 4,906,378, and 4,971,736 relate to composite chromatographic articles comprising a fibrillated PTFE matrix with non-swellable sorptive particles enmeshed therein and optionally comprising glass beads to act as a property modifier and processing aid.

JP 76032728 (abstract) discloses a method for melt spinning polyamide wherein a two layer filter can comprise a layer of glass beads of 70-150 mesh and a layer of sintered metal or wire mesh.

Beds of large glass spheres have been disclosed as useful models to study filtration processes, as disclosed in C. Ghilaglia et al., Journal of Physics D: Applied Physics, 24 (1991) 2111-2114.

SUMMARY OF THE INVENTION

Briefly, the present invention provides a layered filter composite comprising
 a filter medium, and
 on the upstream surface thereof a layer of nonporous, essentially spherical glass microbeads as a filter aid. The filter aid layer can be homogeneous or it can be a graded composite of different layers, each layer comprising glass microbeads of a different average size.

In another aspect, the present invention provides a method for filtering or pre-filtering a liquid mixture containing suspended solids, the method comprising passing the liquid mixture through a layer of glass microbeads. In a further optional step, the resulting filtered (i.e., prefiltered) liquid mixture is passed through a conventional filter medium or solid phase extraction medium.

As noted above, low density and porous materials are considered in the art to be preferred for use as filter aids. Surprisingly, we have found that high-density, non-porous glass beads often perform better than traditional filter aid materials. We believe that the heavy density allows the beads to settle into a more tightly packed bed that will not channel. Because the beads are spherical, they appear to pack into a dense bed (tending to form a body centered cubic structure) that is universally acknowledged to yield maximum void volume. In addition to minimizing the pressure drop in the system, the maximized void space provides more "storage compartments" for suspended solids, thus providing the maximum protection against plugging for the filter medium which has the effect of lengthening its useful life.

In this application:

"filtration" refers only to the size exclusion (physical) mechanism for obtaining separation among multiple phases, particularly for removal of solids from liquids and not for removal of dissolved species;

"glass beads" means spherical beads comprising at least one amorphous, fused metal or nonmetal oxide and having a smooth, fire-polished surface;

"essentially spherical" means including beads with natural variations from true spherical due to random fluctuations in formation processes;

"graded" means a construction of multiple layers, each layer of microbeads having a different average size and/or average bulk density; generally the least dense microbeads form the uppermost layer and the layers vary in a graded order with the layer of highest average bulk density being directly adjacent the filter medium; preferably, the layer of smallest size microbeads is directly adjacent the filter medium;

"filter aid" means a material used in conjunction with a standard filtration medium to pre-filter certain suspended solids from a liquid before those solids reach the filter medium and clog the pore structure; filter aids are useful in extending the useful lifetime of a filtration medium;

"adsorption" means an interaction between a solid surface and a dissolved chemical species;

"upstream surface" means the surface that is disposed toward the source of the fluid to be filtered;

"homogeneous" means having a uniform average size distribution throughout a single layer; and "nonporous" means having a surface area of at most 5.0 $m^2/g$.

DETAILED DESCRIPTION OF THE PREFERRED EMBODIMENTS

This invention discloses the use of non-porous, essentially non-sorptive, spherical glass beads, preferably in a homogeneous layer, as a filter or filter aid to remove suspended solids from liquids. The glass microbeads useful as a filter or filter aid in the present invention are metal oxide glass, e.g., oxides of titanium, barium, sodium, silicon, boron, or zinc, or combinations thereof, having an average particle size (diameter) of from 1 to 90 micrometers, preferably 10 to 60 micrometers, more preferably 20 to 40 micrometers. Preferably the beads are spherical in shape. The surface area of the beads, as measured by BET, is between 0.01 and 5.0 square meters/gram, more preferably 0.01 to 2.0 $m^2g$ and most preferably 0.5 to 1.0 $m^2/g$ The average absolute density of the beads preferably is in the range of 2.0 to 6.0 grams/cc, most preferably 3.0 to 5 g/cc, and preferably their bulk density is in the range 1.2 and 4.0 grams/cc, and more preferably 2.0 to 3.0 g/cc. The microbeads can have the compositions disclosed in U.S. Pat. No. 3,493,403, particularly TABLE I, prepared as disclosed in cols. 6–8. Other preparatory methods have been disclosed in U.S. Pat. No. 2,960,594. Both patents are incorporated herein by reference for their disclosure of preparation and composition of glass microbeads.

The glass beads of this invention are not chromatographically active in that they have very low surface area (non-porous spheres, preferably with surface area less than 5.0 $m^2/g$, more preferably less than 2.0 $m^2/g$, and most preferably the surface area is in the range of 0.5 to 1.0 $m^2/g$), in contrast to traditional chromatographically active particles which have up to 600 square meters/gram surface area. This low surface area characteristic makes them a more ideal filter aid for analytical applications since they will not greatly affect the dissolved compounds in the liquid, which are of analytical interest, yet will physically entrain the solid material.

We have discovered that utility of glass microbeads is optimized by using smaller sized microbeads exclusively. We investigated size ranges that have much smaller average particle sizes and narrower distributions of those sizes compared to naturally occurring materials. We have found that a preferred average size range for optimum efficiency is from 10 to 60 micrometers, most preferably with an average size being in the range of 20 to 40 micrometers. At this average size and with a narrow distribution, the best filtration efficiency can be achieved for both deformable and non-deformable solid materials.

In the present invention a layer of microbeads preferably can be at least 1 mm thick, more preferably 5 mm to 1 meter thick, and even any thickness, for example, many centimeters or even meters thick can be useful. In many laboratory (analytical) applications, a layer about 1 cm in thickness to cover the entire surface of a standard filtration medium is preferred. Large scale processes (remedial or industrial applications) may utilize a bed of a meter or more. When used as a filter aid, the layer of microbeads is placed on the filter medium, the layered filter composite usually being confined in some sort of container, such as a filter holder or filtration reservoir or tank.

The bed of glass microbeads, when used as a filter aid, preferably is a single homogeneous layer. In graded constructions, it is preferred that each layer of microbeads be set down in a dry state with an effort being made to maintain the integrity of each layer. It is preferred when a bed of glass microbeads is used as a filter, without an additional filter medium, to use a graded construction.

The filter medium can be a filter paper, membrane, wire screen, cloth, glass frit, polymeric frit, or metal frit, sorptive or active particles in a column, or any other suitable filter medium with the desired and preferred small average pore size of at most 25 micrometers. Preferred media includes particle loaded nonwoven webs useful in solid phase extractions such as particle loaded polytetrafluoroethylene (PTFE) webs (Empore TM membrane, 3M, St. Paul, Minn.) and particle loaded blown microfibrous webs of polymers such as polyamide, polyolefin, polyester, as are disclosed, for example, in U.S. Ser. No. 07/929,985, or glass fibrous (Toxi-Disk TM, Toxi-Lab Inc., Irvine, Calif.) or cellulosic particle loaded webs (Meadpaper TM 963C Desiccant Paper and Activated Carbon Paper, Mead Corporation, South Lee, Mass. 01260).

Once the beads are in place as a filter, or as a layer on the upstream surface of a filter medium when used as a pre-filter, the liquid sample can be introduced by pouring, decanting, pumping, or gravity flow. Pouring or decanting is the preferred mode. Use of the beads desirably increases the volume of sample that can be processed before the base filter medium clogs, or reduces the processing time of a given volume of sample, when that sample contains suspended solids.

The non-porous glass microbeads of the invention gave surprising performance in laboratory evaluations. When compared against the performance of traditional filter aids, such as diatomaceous earth (Fisher Scientific Inc.), sand, cellulose, or perlite expanded amorphous volcanic rock (Silbrico Inc., Hodgkins, Ill.), performance, defined as the time to process one liter of water, was at least comparable to the best of the traditional filter aids and gave the most consistent overall improvement in filtration rates. For example, the use of microbeads as a pre-filter, in most applications, produced a greater improvement in filtration times with all water matrices than other filter aids.

Some of the performance advantage is presumed to come from the spherical shape of the beads. The spherical shape, once appropriately consolidated in a bed, yields a theoretical void volume of 32%, the practical value being 35 to 40% void volume. This allows for the maximum loading of suspended solids and also causes the least pressure drop among all the filter aids, most of which are irregular in shape. Both maximum loading and low pressure drop are desirable properties of a filter aid. Low pressure drop is especially important for vacuum systems where the driving force is limited to one atmosphere pressure.

Another factor in performance is the high density of the beads as compared to traditional filter aids. This property is presumed to create a more densely packed filtration bed and is particularly convenient during the introduction of the liquid sample, when the analyst wishes to avoid disruption of the filter aid. With low density filter aids, the act of pouring liquid onto the surface of the filter aid can easily disrupt the bed through turbulence. Diatomaceous earth, for example, can form a suspension which is slow to settle. Beads, on the other hand, readily settle into a packed bed within a short period of time, generally less than 1 minute, thus preserving the original thickness of the filter aid bed.

Another performance advantage has to do with the inert nature of these beads. Since the final step in their preparation is a fire polishing conducted at about 800° C., the beads have very little surface area and little surface chemical activity. This low surface area and activity can be valuable if the analyst wishes to avoid adsorption of chemical species onto the filter aid's surface. In fact, as noted above, diatomaceous earth has been used as an adsorptive chromatographic medium. An example below shows no reduction in the percent recovery of a series of phthalates when the beads are used, showing the beads did not interfere with recovery of analytes.

Examples below show the efficacy of the beads for pre-filter applications. In one example a beverage was filtered through an Empore TM Extraction Disk both with and without the glass bead filter aid. The data show that the filtration time was reduced by 75% when the filter aid of the present invention was used. By way of comparison, the same beverage was filtered using sand as a filter aid (140-240 micrometer diameter), which caused a 70% increase in filtration time. In another example, several different water matrices were processed through Empore TM Extraction Disks with and without the glass bead filter aid. In the present invention, filtration times for one liter samples were reduced by between 50 and 75%. Multiple tests were run comparing the glass bead filter aid against other filter aids on various water matrices. On average, glass beads gave the most consistent reduction in filtration times for both deformable and non-deformable suspended solids.

Liquid mixtures comprising suspended or settled organic, inorganic, or biological solids can be efficiently filtered using glass microbeads as a pre-filter. The method and layered filter composite is useful in analytical, industrial, and remedial applications, particularly where it is desirable to clean up fouled water or other liquid comprising suspended or settled solids.

In the Examples below, unless otherwise stated:
glass beads (25, 40, 60, or 80 micrometers, average absolute density of 4.7 g/cc, average bulk density of 2.75 g/cc) were obtained by the process described in U.S. Pat. No. 3,493,403, cols. 6–8, and U.S. Pat. No. 2,960,594. The beads had a composition: $TiO_2$ 55 wt. %, BaO 38 wt %, and ZnO 7 wt %. Beads of specific diameter and size distribution were obtained by sieving.
glass beads (40, 60, or 80 micrometers, average absolute density 3.7 g/cc, average bulk density of 2.2 g/cc) prepared by the methods disclosed in U.S. Pat. No. 3,493,403, col. 6–8, and in U.S. Pat. No. 2,960,594; having the composition: $TiO_2$ 47 wt. %, BaO 28 wt. %, $SiO_2$ 13 wt. %, $Na_2O$ 8 wt. %, $B_2O_3$ 3 wt. %, $K_2O$ 1 wt. %.

Identification and sources of other filter aids and filter media are:
perlite—expanded amorphous mineral rock, Silbrico, Hodgkins, Ill.;
Empore Extraction Disk—3M, St. Paul, Minn.;
GMF TM 150 —Whatman TM glass microfiber pre-filter, Whatman Co., Inc.
diatomaceous earth (also referred to as infusorial earth)—Fisher Scientific Co., Pittsburgh, Pa., cat. no. I22-3;
sand—Fisher Scientific Co., cat. no. S150-3;
paper pulp—Schleicher & Schuell, Keene, N.H., cat. no. 07250;
Spheriglass TM (soda-lime glass spheres A5000 TM, average diameter 12 micrometers), Potter Industries, Inc. Parsippany, N.J.;
soda-lime or boro-silicate crushed glass, size less than 212 micrometers, G2000 TM, Potter Industries, Inc., Parsippany, N.J.;
ground cellulose—20 and 50 micrometer, Sigma Chemical Co., St. Louis, Mo.;
Scotchlite TM glass bubbles—3M, St. Paul, Minn.;
Macrolite TM brand ceramic spheres—3M, St. Paul, Minn.;
cellulose filter paper, grades 40 and 41, Whatman Co., Inc., Clifton, N.J.;
cellulose acetate filter medium, Sartorius Filters, Inc., Hayward, Calif.;

glass fiber filter medium—GF/F grade, Whatman Co., Inc.

EXAMPLE 1

One hundred (100) milliliters of a malted beverage sample (Heilemann's Old Style Beer) was passed through an Empore ™ Extraction Disk (3M, St. Paul, Minn.) mounted in a 47 millimeter diameter filtration apparatus (Millipore Corporation Catalog No. XX10-047-30). Pressure was reduced to about 125 mm mercury (also referred to as about 25 inches of mercury vacuum) in the receiving flask beneath the filter medium to supply the driving force for the filtration. Processing time without a filter aid was 23.9 minutes. Three (3) cubic centimeters of 40 micrometer diameter glass beads, obtained as described in U.S. Pat. No. 3,493,403, having the composition $TiO_2$ 55%, BaO 38%, ZnO 7%, absolute density 4.7 g/cc, with a bulk density of 2.75 g/cc, were poured into the reservoir of the filtration apparatus and formed a packed bed approximately 2.6 mm deep on the surface of a second Empore Extraction Disk. Processing time was reduced by 74% to 6.3 minutes. Onto a third Empore Extraction Disk, three cubic centimeters of silica sand (Fischer Catalog No. S-150-3) was poured into the reservoir of the filtration apparatus and formed a packed bed on the surface of the Empore Extraction Disk of approximately the same depth as the glass microbeads. The addition of the silica sand, however, did not reduce the processing time but instead increased it by 71% to 40.8 minutes.

EXAMPLE 2

A liter of water was fortified at the 100 ppb level with a group of characteristic phthalate compounds as shown in TABLE I, below, and passed through the filtration apparatus of Example 1 (without and with glass microbeads of two different densities were evaluated) to compare the extraction efficiency of an Empore Extraction disk. Four phthalate compounds were examined: dimethyl-, diethyl-, di-n-butyl, and di-n-octylphthalate. Percent recovery is defined as the weight ratio of extracted compound eluted from the Empore Extraction disk divided by the known amount originally added to the sample multiplied by 100. Trials were conducted on the filtration apparatus of Example 1 using 125mm of mercury pressure in the receiving flask beneath the filter medium. Water matrix sample size was one liter. The data are shown in TABLE I, below.

TABLE 1

Comparison of Percent Recoveries for Phthalate Compounds

| Sample | dimethyl phthalate | diethyl phthalate | dibutyl phthalate | dioctyl phthalate |
|---|---|---|---|---|
| Empore Extraction Disk (comparative) | 68 | 98 | 99 | 76 |
| Empore Extraction Disk + 10 cc 4.7 g/cc av. absolute density beads, 40 micrometer | 77 | 100 | 102 | 95 |
| Empore Extraction Disk + 10 cc 3.7 g/cc av. absolute density beads, 40 micrometers | 78 | 111 | 105 | 91 |

The data of TABLE I show the glass beads were inert and did not irreversibly adsorb the phthalate compounds.

EXAMPLE 3

Glass microbeads with an absolute density of 4.7 g/cc and particle size of 40 micrometers were examined in a side-by-side comparison of filter aids with a variety of water matrices. Various pre-filter media were also examined. In all cases, the filter medium utilized for this examination was Empore ™ Extraction Disks, except one trial where no filter medium was used when glass microbeads were used as the filter. Several types of water matrices were examined: Lake Water (example of setting water with fresh water feed), pond water (example of setting water with runoff feed only), river water (example of moving water with slow flow; two samples of this water were examined. The sample labeled "Slow A" was considered to have a normal concentration of suspended solids. The sample labeled "Slow B" was much more highly loaded with suspended solids since it was collected within 12 hours after a heavy rain); POTW water (effluent from a public works facility); and creek water (example of moving water with rapid flow). Other filter aids tested included diatomaceous earth, sand, filter paper, paper pulp, and perlite. All tests were conducted on a 90 mm filtration apparatus (Millipore Corp. Catalog No. 90-753-2) with 250 mm Hg pressure (20 inches of mercury vacuum) in the receiving flask. Sample size was one liter. Results are given in Table II below.

TABLE II

Filtration Times for Various Filters and Filter Aids for a Variety of 1-Liter Water Samples
Table Times in Minutes. Empore ™ Extraction Disks used in all cases.

| sample preparation | setting runoff[a] | setting spring[b] | moving slow A | moving slow B | moving rapid | POTW |
|---|---|---|---|---|---|---|
| no filter aid or pre-filter (comparative) | 303.0 | 20.37 | 46.5 | 83.7 | 33.0 | 22.2 |
| GMF 150 pre-filter (comparative) | 55.5 | 14.3 | 12.0 | 163.2 | — | 11.8 |
| 4.7 g/cc beads, 40 micrometers | 63.8 | 9.4 | 4.9 | 6.3 | 16.0 | 10.9 |
| diatomaceous earth (comparative) | 107.6 | — | — | — | — | — |
| sand (comparative) | 244.5 | — | — | — | — | — |
| paper pulp (comparative) | 180.9 | — | — | — | — | — |
| perlite (comparative) | — | — | — | 38.8 | — | — |
| 4.7 g/cc beads[c], 80 micrometers | — | — | 3.6 | — | — | — |

[a] pond water
[b] lake water (spring-fed)
[c] microbeads were used as a filter; no other filter medium present
(—) means trial not conducted The data of TABLE II show the layer filter composite of the present invention exhibited the most consistent improvement in filtration times for water samples tested. Additionally, the data showed that glass microbeads alone provided a useful filter medium.

EXAMPLE 4

Glass microbeads were evaluated in a side-by-side comparison with a number of filter aids on a variety of water matrices. Glass microbeads with absolute densities of 4.7 and 3.7 g/cc and with varying particle diameters were compared against a variety of commercially available filter aid materials. The filter media utilized for these trials were Empore Extraction Disks, glass fiber filters (GF/F grade, Whatman Co., Inc.), cellulose (grade 40 and 41, Whatman Co., Inc.) filter papers, and 0.45 micrometer cellulose acetate filter media, Sartorius Co. Two types of water matrices were examined, pond water and effluent POTW water. Other filter aids examined include diatomaceous earth, sand, ground cellulose (Schliecher & Schuell, Keene, N.H.), perlite, Macrolite TM brand hollow ceramic spheres (3M Company, St. Paul, Minn.), Scotchlite TM brand glass bubbles (3M Company, St. Paul, Minn.), and Spheriglass TM solid glass spheres (Potter Industries, Parsippany, N.J.). All evaluations were conducted on the filtration apparatus of Example 3 using identical operating conditions. Data are given in TABLE III below.

TABLE III

Comparison of Various Filter Aids on Three Water Matrices

| RUN DESCRIPTION | POND WATER | POTW EFFLUENT |
|---|---|---|
| Empore TM Extraction Disk Filter Medium | 130.0 | 70.02 |
| 25 micrometer beads (prepared as in U.S. Pat. No. 3,493,403) absolute density 4.7 g/cc, 10 mm depth | 30.3 | 37.0 |
| 40 micrometer beads, 4.7 g/cc, 10 mm depth | 58.8 | 26.1 |
| 60 micrometer beads, 4.7 g/cc, 10 mm depth | 76.0 | 31.9 |
| 80 micrometer beads, 4.7 g/cc, 10 mm depth | 64.2 | 51.4 |
| 40, 60, and 80 micrometer beads, 3.7 g/cc absolute density, 15 mm depth | 67.2 | 24.8 |
| 40 micrometer beads, 3.7 g/cc, 10 mm depth | 63.6 | 41.4 |
| 60 micrometer beads, 3.7 g/cc, 10 mm depth | 68.2 | 32.9 |
| 80 micrometer beads, 3.7 g/cc, 10 mm depth | 91.5 | 39.2 |
| 40, 60, and 80 micrometer beads, 4.7 g/cc, 15 mm depth | 83.5 | 34.3 |
| G2000 TM crushed glass, 10 mm depth (comparative) | 165.7 | 64.2 |
| Spheriglass A5000 TM glass spheres, 10 mm depth | 38.0 | 40.2 |
| diatomaceous earth, 10 mm depth, Fisher Scientific Co., Inc. (comparative) | 116.0 | 54.0 |
| Perlite 25M, Silbrico Co., Hodgkins, IL, 10 mm depth (comparative) | 122.5 | 35.6 |
| Perlite 40M, 10 mm depth (comparative) | 101.8 | 42.0 |
| Perlite 25M and 40M, 10 mm depth (comparative) | 115.4 | 46.1 |
| sand 280 to 520 micrometer size (30 to 50 mesh) (Fisher Scientific Co., Inc., Pittsburgh, PA) (comparative) | — | 95.1 |
| 20 micrometer ground cellulose (Sigma Chemical Co., St. Louis, MO), 10 mm depth (comparative) | 54.4 | 49.7 |
| 60 micrometer Scotchlite TM glass bubbles (3M, St. Paul, MN), 10 mm depth | — | 62.3 |
| 20/40 grade Macrolite TM brand ceramic spheres, 3M, St. Paul, MN, 10 mm depth (comparative) | — | 145.47 |
| 20/40, 30/50, 40/60 grade Macrolite TM brand ceramic spheres, 3M, St. Paul, MN, 15 mm depth (comparative) Cellulose paper filter medium (Whatman Co., Inc.) | — | 69.1 |
| 20 micrometer filter paper, grade 41 (comparative) | 2.4 | 1.4 |
| 20 micrometer filter paper (grade 41) with 40 micrometer, 4.7 g/cc glass beads, 10 mm depth | 5.6 | 2.9 |
| 8 micrometer filter paper (grade 40) | 13.8 | 9.8 |

TABLE III-continued

Comparison of Various Filter Aids on Three Water Matrices

| RUN DESCRIPTION | POND WATER | POTW EFFLUENT |
|---|---|---|
| (comparative) | | |
| 8 micrometer filter paper (grade 40) with 40 micrometer, 4.7 g/cc glass beads, 10 mm depth Cellulose acetetate Filter Medium (Sartorius, Inc.) | 24.1 | 3.8 |
| 0.45 micrometer cellulose acetate filter (comparative) | 23.4 | — |
| 0.45 micrometer cellulose acetate filter with 40 micrometer, 4.7 g/cc beads, 10 mm depth Glass Fiber Filter Medium (grade GF/F, Whatman Co., Inc.) | 6.4 | — |
| 1 micrometer glass fiber filter (comparative) | 2.6 | 2.8 |
| 1 micrometer glass fiber filter with 40 micrometer, 4.7 g/cc beads, 10 mm depth | 4.8 | 2.8 |

(—) means trial not conducted

The data of TABLE III show that generally smaller diameter prefilter particles increase the flow rate through the filter medium. Glass beads of 40 micrometer are preferred and performed at least as well and frequently better than conventional filter aids. Graded beds of glass beads (e.g., 40, 60, 80 micrometers) were used and were shown to be useful as filter aids.

EXAMPLE 5

The effect of density was quantified by timing the interval between the introduction of the water sample and the point at which the reservoir becomes clear again. Pouring a liquid into the reservoir of the filtration apparatus caused the dry filter aid to be displaced due to the kinetic energy generated during the liquid's free fall to the bottom of the reservoir. This created a milky appearance in the reservoir until the filter aid settled back into the packed bed at the bottom of the reservoir. We measured the time that elapsed from the point at which the liquid sample was added until we could once again see through the reservoir. The trials were conducted on the filtration apparatus of Example 2 with the same operating conditions. The data for this evaluation appear in TABLE IV, below.

TABLE IV

Settling Data

| Filter Aid | | (Grade 40) 8 micrometer filter medium** | (Grade 41) (20 micrometer filter medium** |
|---|---|---|---|
| 40 micrometer glass beads, 4.7 g/cc, 10 mm depth | Settling time Filtration time | 0.5 minutes 3.8 minutes | 0.5 minutes 2.8 minutes |
| diatomaceous earth 10 mm depth (comparative) | Settling time Filtration time | 4.0 minutes* 4.0 minutes | 1.8 minutes* 1.8 minutes |
| diatomaceous earth 10 mm depth (packed) (comparative) | Settling time Filtration time | Trial Not Conducted | 0.6 minutes 2.3 minutes |

*Did not settle
**cellulose filter paper

The data of TABLE IV show that glass beads settle (reconstitute the bed) more rapidly than diatomaceous earth. Diatomaceous earth can be made to settle more rapidly by pre-wetting which packs the bed more tightly and slows the filtration rate.

EXAMPLE 6

The effect of filter aids on the pressure drop in the filtration apparatus was also examined. The increase in pressure drop caused by 40 micrometer, 4.7 g/cc beads was compared to that caused by diatomaceous earth. Diatomaceous earth was examined in three forms, a volume as loose packed that was equal to that of the glass beads, a volume of packed diatomaceous earth that was again equivalent to that of the glass beads, and a weight equivalent to that of the glass beads. To measure the impact of pressure drop only, we utilized ultrapure water as the liquid phase for this evaluation so that processing time was not affected by plugging of the filter medium. The increase in pressure drop was related to the increase in total processing time over the processing time using no filter aid. Two filter media were examined, 8 and 20 micrometer rated cellulose filter papers. The evaluation was conducted on the filtration apparatus of Example 2 with the same operating conditions. The data are given in TABLE V, below.

TABLE V

Pressure Drop Effect of Filter Aids

| Sample | (Grade 40) 8 micrometer filter medium* | (Grade 41) 20 micrometer filter medium* |
|---|---|---|
| no filter aid (comparative) | 1.04 minutes | 0.23 minutes |
| 40 micrometer beads, 10 mm, 25.8 grams, 4.7 g/cc absolute density | 3.8 minutes | 2.8 minutes |
| diatomaceous earth, 10 mm depth (loose) (comparative) | 4.0 minutes | 1.8 minutes |
| diatomaceous earth, 10 mm depth (packed) (comparative) | — | 2.3 minutes |
| 40 micrometer beads, 12 grams, 4.7 g/cc | 1.5 minutes | — |
| diatomaceous earth, equal weight (comparative) | 7.6 minutes | — |

(—) means trial not conducted
*cellulose filter paper

The data of TABLE V show that as the processing rate slows, the diatomaceous earth tended to pack more and more densely, thus extending processing time even further. The effect worsened as more and more weight of diatomaceous earth was used. In fast-flowing systems, the diatomaceous earth remained suspended long enough to prevent dense packing. On average, however, the glass bead filter aid exhibited less pressure drop per unit volume or per unit weight compared to diatomaceous earth.

EXAMPLE 7

A detailed comparison was made on the efficiency of the 40 micrometer, 4.7 g/cc beads, versus diatomaceous earth for a moving water sample containing a moderate level of sediment (non-deformable). Filtrations were performed using the filtration apparatus of Example 2 with the same operating conditions and Empore Extraction Disks were used as the filter media. The data are shown in TABLE VI below.

TABLE VI

Filtration Times for Beads and Diatomaceous Earth

| Sample | Total Processing Time |
|---|---|
| no filter aid (comparative) | 453 minutes |
| 40 micrometer beads, 7.5 mm depth (19.4 g) | 48.6 minutes |
| diatomaceous earth, 7.5 mm depth, (loose) (comparative) | 80.0 minutes |
| diatomaceous earth, 7.5 mm depth, (packed) (comparative) | 87.3 minutes |
| diatomaceous earth, 19.4 g (comparative) | 78.9 minutes |

The data of TABLE VI show that whether based on equal volume or equal weight, the glass beads outperformed (shorter processing time) diatomaceous earth for removal of sediment from water.

Various modifications and alterations of this invention will become apparent to those skilled in the art without departing from the scope and spirit of this invention, and it should be understood that this invention is not to be unduly limited to the illustrative embodiments set forth herein.

We claim:

1. A layered filter composite comprising
an average filter medium having a pore size of at most 25 micrometers, and
on the upstream surface thereof a layer of nonporous essentially spherical glass microbeads as a filter aid, said glass microbeads comprising metal oxide and having an average size in the rang of 1 to 90 micrometers and a surface area in the range of 0.01 to 5.0 m$^2$/g.

2. The composite according to claim 1 wherein said glass microbeads have surface area in the range of 0.01 to 2.0 m$^2$/g.

3. The composite according to claim 1 wherein said glass microbeads have a surface area in the range of 0.05 to 1.0 m$^2$/g.

4. The composite according to claim 1 wherein said glass microbeads have an average size in the range of 10 to 60 micrometers.

5. The composite according to claim 1 wherein said glass microbeads have an average size in the range of 20 to 40 micrometers.

6. The composite according to claim 1 wherein said glass microbeads have an average absolute density in the range of 2.0 to 6.0 g/cc.

7. The composite according to claim 1 wherein said layer of glass microbeads has a thickness of at least 1 mm.

8. The composite according to claim 1 wherein said filter medium is selected from the group consisting of membranes, papers, wire screens, cloth, nonwoven webs, and sorptive or active particles in a column.

9. The composite according to claim 1 wherein said layer of glass microbeads is homogeneous.

10. The composite according to claim 1 wherein said glass microbeads is a composite of layers of graded glass microbeads.

11. A layered filter composite comprising
a particle loaded nonwoven web as a filter medium, and
on the upstream surface thereof a layer of nonporous essentially spherical glass microbeads in a packed bed, said microbeads having an average size in the range of 1 to 90 micrometers as a filter aid.

12. The composite according to claim 11 wherein said particle loaded nonwoven web comprises a polytetrafluoroethylene web.

13. The layered filter composite according to claim 11 wherein said glass microbeads have an average absolute density in the range of 2.0 to 6.0 g/cc.

14. A layered filter composite comprising
 a filter medium, said medium being a nonwoven web selected from the group consisting of paper and polymers, and
 on the upstream surface thereof a layer of nonporous essentially spherical glass microbeads in a packed bed, said microbeads having an average size in the range of 1 to 90 micrometers.

15. The composite according to claim 14 wherein said filter medium has an average pore size of at most 25 micrometers.

16. The layered filter composite according to claim 14 wherein said glass microbeads have an average absolute density in the range of 2.0 to 6.0 g/cc.

17. A method for filtering a liquid mixture comprising suspended solids, said method comprising the step of passing the liquid mixture through a layered filter composite comprising
 a filter medium having a pore size of at most 25 micrometers, and
 on the upstream surface thereof a layer of nonporous, essentially spherical glass microbeads as a filter aid, said glass microbeads comprising metal oxide and having an average size in the range of 1 to 90 micrometers and a surface area in the range of 0.01 to 5.0 m$^2$/g.

18. The method according to claim 17 further comprising the step of passing the resulting filtered liquid mixture through a conventional filter medium.

19. The method according to claim 18 wherein said conventional filter medium comprises said layer of glass microbeads on its upstream surface.

20. The method according to claim 19 wherein said conventional filter medium is selected from the group consisting of membranes, papers, wire screens, cloth, nonwoven webs, and sorptive or active particles in a column.

21. The method according to claim 17 wherein said glass microbeads have an average size in the range of 1 to 90 micrometers, an average absolute density in the range of 2.0 to 6.0 g/cc and a surface area in the range of 0.01 to 2.0 m$^2$/g.

22. A method for filtering a liquid mixture comprising suspended solids, said method comprising the step of passing the liquid mixture through a layered filter composite comprising
 a filter medium, comprising a nonwoven web, wherein said nonwoven web is a particles-loaded polytetrafluoroethylen web, and
 on the upstream surface thereof a layer of nonporous essentially spherical glass microbeads in a packed bed, said microbeads having an average size in the range of 1 to 90 micrometers as a filter aid.

23. The method according to claim 22 wherein said glass microbeads have an average absolute density in the range of 2.0 to 6.0 g/cc.

* * * * *

UNITED STATES PATENT AND TRADEMARK OFFICE
CERTIFICATE OF CORRECTION

PATENT NO. : 5,366,632

DATED : November 22, 1994

INVENTOR(S) : William V. Balsimo et al.

It is certified that error appears in the above-indentified patent and that said Letters Patent is hereby corrected as shown below:

On the title page, under [56] References Cited, U.S. Patent Documents:

"4,153,661   5/1979   Ree et al." should be

-- 4,153,661      5/1979      Ree et al.         264/120 --

"4,713,338   12/1987   Gonzalez-Oliver" should be

-- 4,713,338     12/1987     Gonzalez-Oliver  435/176 --

"4,810,381   3/1989   Hagen et al." should be

-- 4,810,381     3/1989      Hagen et al.       210,502.1 --

4,906,378   3/1990   Hagen et al." should be

-- 4,906,378     3/1990      Hagen et al.       210/6352 --

4,971,736   11/1990   Hagen et al." should be

-- 4,971,736     11/1990     Hagen et al.       264/22 --

"5,128,291   7/1992   Wax et al." should be

-- 5,128,291     7/1992      Wax et al.         502/8 --

On the title page, under [56] References Cited, Foreign Patent Documents, "52-32728" 9/1976 Japan" should be -- 760-32728 --.

Col. 1, line 48, "pp 19-63" should be -- pp 19-63 --.

UNITED STATES PATENT AND TRADEMARK OFFICE
CERTIFICATE OF CORRECTION

PATENT NO. : 5,366,632

DATED : November 22, 1994

INVENTOR(S) : William V. Balsimo

It is certified that error appears in the above-indentified patent and that said Letters Patent is hereby corrected as shown below:

Col. 4, line 2, "1.0 m$^2$/g The" should be -- 1.0 m$^2$/g. The --

Col. 12, line 26, "an average filter medium" should be -- a filter medium --.

Col. 12, line 26, "a pore size" should be -- an average pore size --.

Col. 13, line 15, after "90 micrometers" add -- as a filter aid --.

Col. 14, line 25, "polytetrafluoroethylen" should be -- polytetrafluoroethylene --.

Signed and Sealed this

Seventeenth Day of October, 1995

Attest:

BRUCE LEHMAN

*Attesting Officer*          *Commissioner of Patents and Trademarks*